PROGRAMME CONTROLLED BOARD PIERCING EQUIPMENT

Filed June 23, 1960

Inventors
F.Gray-C.W.Robinson-
R.Collins
By [signature]
Agent

| Y-AXIS | | | | X-AXIS | | | | Y | X | |
|---|---|---|---|---|---|---|---|---|---|---|
| .200" | .100" | .050" | .025" | .200" | .100" | .050" | .025" | FWD OR BWD | FWD OR BWD | PUNCHES |
| 1 | | | | 1 | | | | F | F | A |
| 1 | | | | 2 | | X | | – | F | AB |
| 1 | X | | | 2 | | X | X | – | – | BCD |
| 1 | X | | | 0 | X | X | | – | B | C |
| 2 | | X | | 0 | X | | | F | – | AD |
| 2 | | X | | 2 | | | | – | F | ABCD |
| 3 | | | X | 0 | X | X | X | F | B | BD |
| 3 | | X | X | 4 | | | | – | F | ABD |
| 2 | X | X | X | 5 | X | | X | B | F | AC |
| 2 | X | | | 5 | | | | – | – | ABC |
| 2 | X | | | 3 | X | X | | – | B | B |
| 1 | X | X | | 4 | | | X | B | F | BC |
| 1 | X | X | | 5 | | X | | – | F | CD |
| 0 | X | | X | 5 | | X | | B | – | ACD |
| 0 | X | | | 4 | | | | – | B | D |

Inventors
F.Gray-C.W.Robinson-
R.Collins
By Paul W. Hemminger
Agent

Jan. 15, 1963 F. GRAY ETAL 3,073,518

PROGRAMME CONTROLLED BOARD PIERCING EQUIPMENT

Filed June 23, 1960 4 Sheets-Sheet 3

*Inventors*
F.Gray-C.W.Robinson-
R.Collins
By [signature]
Agent

Jan. 15, 1963 F. GRAY ETAL 3,073,518

PROGRAMME CONTROLLED BOARD PIERCING EQUIPMENT

Filed June 23, 1960

4 Sheets-Sheet 4

*Inventors*

F.Gray-C.W.Robinson-
R.Collins

By [signature]

Agent

United States Patent Office 3,073,518
Patented Jan. 15, 1963

3,073,518

PROGRAMME CONTROLLED BOARD PIERCING EQUIPMENT

Frank Gray, Charles William Robinson, and Reginald Collins, London, England, assignors to International Standard Electric Corporation, New York, N.Y.

Filed June 23, 1960, Ser. No. 38,159
Claims priority, application Great Britain July 29, 1959
7 Claims. (Cl. 234—28)

Figures 1, 2:
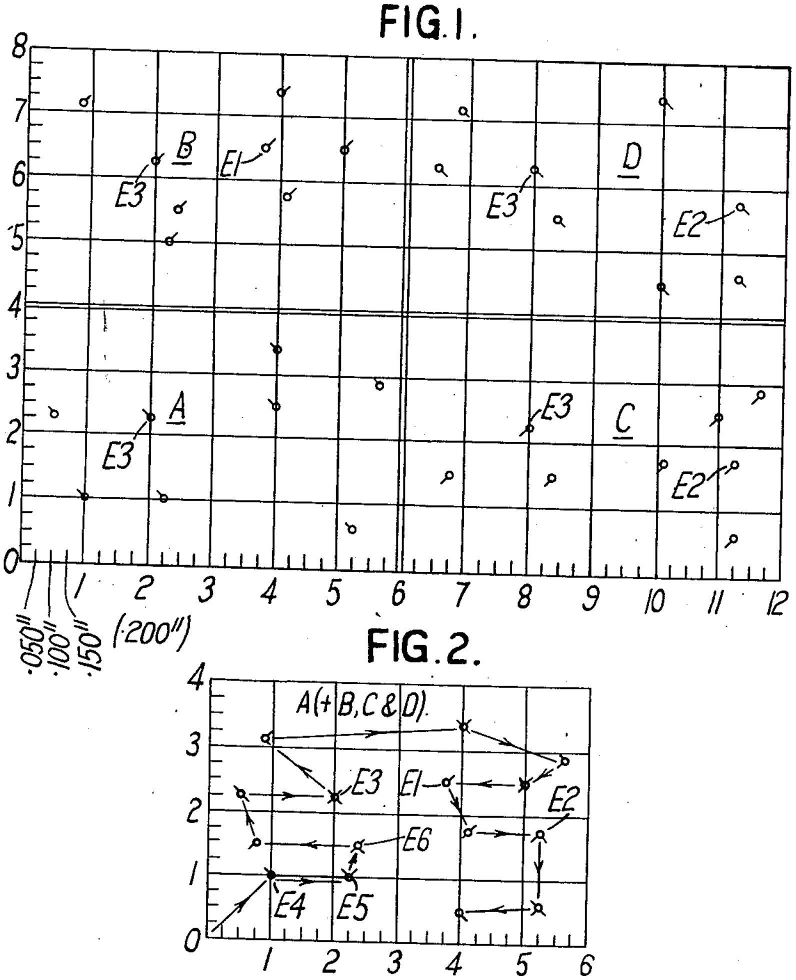

This invention relates to equipment for piercing sheet material, for example insulating board used in the production of electrical circuit assemblies.

In the production of electrical circuit assemblies of the type in which the electrical component lead wires are passed through holes in an insulating board and interconnected with appropriately laid out conductors, which may be printed or otherwise deposited or affixed on the surface of the board, it is necessary to first pierce the board with a multiplicity of correctly located holes for the reception of the component lead wires. In the case of the so-called "printed" circuits, the printed conductors are already provided on the board, and these conductors are therefore also pierced during the hole piercing operation.

An object of the present invention is to enable such insulating boards to be quickly and accurately pierced with the required holes under programme control.

According to one aspect of the invention there is provided a method of positioning and piercing sheet material in a machine having sheet material holding means movable relative to a plurality of individually operable material piercing tools, in which the tools are arranged in at least one set of two or more tools, all the tools of a set being situated on a common straight line with each tool spaced from at least one other tool of the set by a distance $a$, in which the holding means is traversed in a direction parallel to said straight line over a distance not exceeding the distance $a$ when in operative relationship with the tools, and in which the tools are selectively operated according to the position of the holding means.

According to another aspect of the invention there is provided equipment for piercing sheet material including sheet material holding means movable in $x$ and $y$ co-ordinate direction, means for separately moving said holding means over maximum permissible distances $a$ and $b$ in the $x$ and $y$ co-ordinate directions respectively, at least one set of two or more board piercing tools arranged on a common $x$ ordinate and each tool being spaced from at least one other tool of the set by a distance equal to the distance $b$, and means for selectively operating the piercing tools in any desired combination.

The board to be pierced with holes is considered as being divided up along its two co-ordinate axes into a number of portions preferably identical. One edge portion is taken as a datum portion, and the remaining portions are considered as being symmetrically superimposed on the datum portion so that all the required hole positions are in the datum portion.

The piercing machine has as many punches as there are board portions, and the punches are correspondingly located over the same co-ordinate position in different portions.

The programme, compiled from the datum portion containing all the required hole positions, causes the board to be co-ordinately positioned under the punches for each hole position, followed by operation of those punches over such portions of the board in which holes are required for that portion of the board.

A number of smaller boards may be produced in the same way, by considering them as one large board. All the holes are punched in a single large board, after which it is cut up into the required smaller boards.

Figure 5:
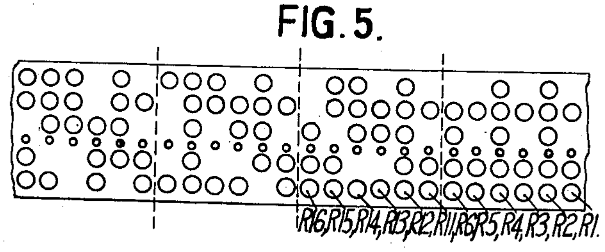
Figures 3, 4:
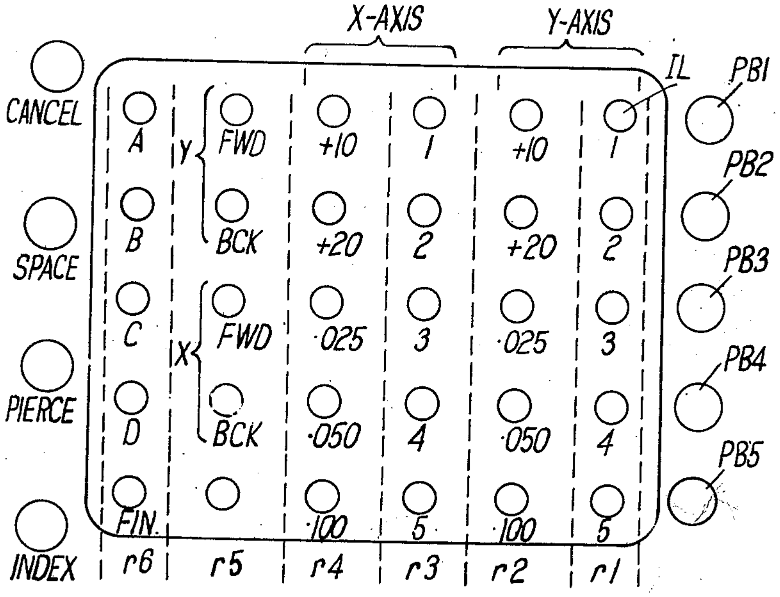
Figure 6:
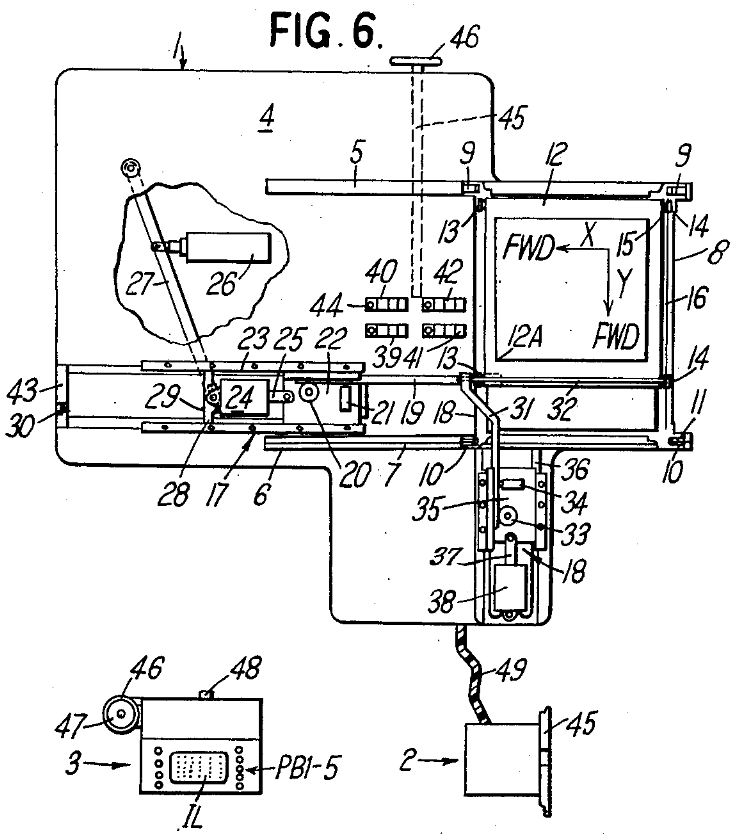
Figure 7:
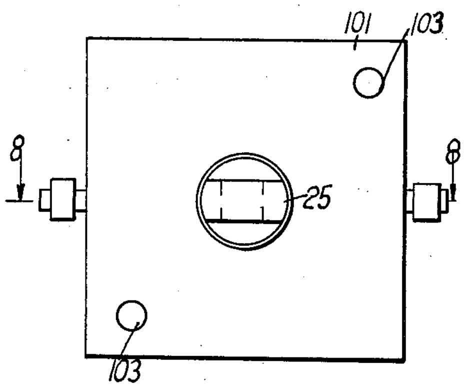
Figure 8:
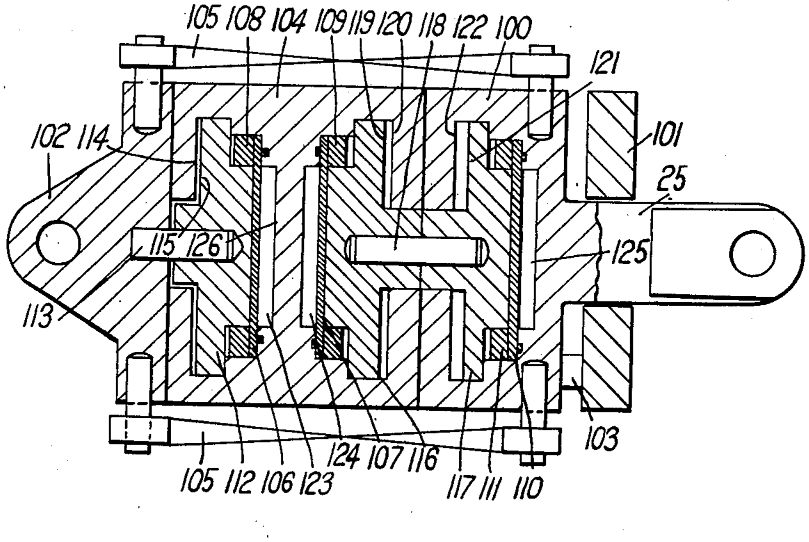

An embodiment of the invention for piercing holes in electrical circuit boards will now be described with reference to the accompanying drawings, in which:

FIG. 1 is a graphical representation of an electrical circuit board showing the position of the holes required, FIG. 2 shows the graphical rearrangement of FIG. 1 for preparing the programme, FIG. 3 shows the programme table, FIG. 4 shows the control panel of a tape perforator, FIG. 5 shows a portion of a tape programmed in accordance with a table of FIG. 3, FIG. 6 is a partly schematic plan view of the complete board piercing equipment, FIG. 7 is an end elevation of part of the board piercing machine of FIG. 6, FIG. 8 is a sectioned plan view along the line 8—8 of FIG. 7.

A board piercing machine to be described in detail later, essentially comprises a co-ordinately movable table into which is loaded a board to be pierced, the loaded table being successively positioned under a group of four spaced punches. The table has a maximum permissible movement in $x$ and $y$ co-ordinate directions of distances $a$ and $b$ respectively, and in the described embodiment $a=1.2$ inches and $b=0.8$ inch.

It is possible to utilize the method of the invention for positioning and piercing a board in a machine having a board holding table movable relative to a number of individually operable punches, in which the table is only required to move in one direction and in which the punches are arranged in at least one set on a line parallel to this direction with the spacing between each punch and at least one other punch of the set equal to the maximum required movement of the table in this single direction. Thus, with a board having a length of $m$ units in the direction of movement of the table and with a set of $p$ punches, where $p \geqq 2$, the table is required to move only a distance of $m/p$ which is the distance $a$.

The table is normally moved in each co-ordinate direction in steps of 0.200 inch which is the basic module of the machine. This movement may be effected in either a forward or a backward direction. The table is further movable in each co-ordinate direction, but in a forward direction only, in sub-module steps of 0.025 inch, 0.050 inch, 0.075 inch, 0.100 inch, 0.125 inch, 0.150 inch, or 0.175 inch, i.e. in eighths of the basic module.

The first stage in producing an electrical circuit board with the required holes pierced therein is the reproduction on squared paper of a replica of the board showing graphically all the required hole positions, as shown in FIG. 1. The paper is marked off on each co-ordinate axis with the basic module steps by the numerals 0–8 for the Y-axis, and 0–12 for the X-axis.

Thus FIG. 1 is a replica of a rectangular board measuring $8\times0.200$ inch by $12\times0.200$ inch, i.e. 1.6 inches by 2.4 inches. It will be understood that this particular dimension is chosen purely by way of example, to illustrate the programming and functioning of the machine. The machine to be described will accommodate any size of board up to the order of 10 inches square (in which case, $a=b=5$ inches if the board is considered in quarters), and this maximum may of course be extended within reasonable practical limits to any larger size of board by suitable dimensioning of the co-ordinately movable table.

The board replica is now divided into four quarters A, B, C and D, and the holes individual to each quarter are appropriately identified as belonging to that quarter, for example by extending from each hole marked on the paper a short line, each identifying line lying in a different quadrant according to the quarter in which the corresponding hole is located. If a hole should happen to lie on a quarter dividing line, it is assigned to one or other of the two quarters concerned.

The four punches of the board piercing machine are movable to alter the spacing therebetween, and are so adjusted that each punch is arranged to lie over a different quarter of the board.

Thus with a board having the dimensions of 1.6 inches by 2.4 inches, the punch lying over quarter A, which is a datum quarter, is arranged to lie over the point 0, 0 of the board in the initial working position of the table, the punch lying over quarter B is arranged to be over the point 0, 4 of the board, the punch lying over quarter C is arranged to be over the point 6, 0 of the board, and the punch lying over the quarter D is arranged to be over the point 6, 4 of the board.

Thus the A and B quarter punches are spaced from each other in the direction of the Y-axis by a distance of 4×0.200 inch, i.e. 0.800 inch which is the distance *b*, and so are the C and D quarter punches, while the C and D quarter punches are spaced from the A and B quarter punches in the direction of the X-axis by a distance of 6×0.200 inch, i.e. 1.200 inches which is the distance *a*.

The next stage is to graphically superimpose the quarters B, C and D on the datum quarter A. This may conveniently be done on FIG. 1, but for clarity is shown as a separate operation in FIG. 2.

All the required holes are now in the datum quarter A, and each hole is marked by one or more identifying lines according to which quarter or quarters it belongs. Thus, for example, hole E1 is individual to quarter B, hole E2 is common to quarters C and D, and hole E3 is common to all four quarters. It will be seen that these three holes are correspondingly identified.

The next stage is to trace a series of straight lines, starting from the datum point 0, 0, which together negotiate all the hole positions by the shortest possible path. Arrow-heads are added to the lines to indicate direction, left to right being the forward direction, and right to left the backward direction for the X-axis, and upwards the forward direction and downwards the backward directions for the Y-axis.

The programme table of FIG. 3 is prepared from FIG. 2 in the following manner:

When the board piercing machine is ready to commence operation, the co-ordinate table holding the blank board to be pierced is automatically positioned so that the datum point 0, 0 lies under the A quarter punch. As has already been explained, the remaining three punches each lie over what may be termed the equivalent quasi-datum point in the respective quarter.

The first hole to be pierced, hole E4, is positioned at point 1, 1 from the datum point 0, 0. Therefore the co-ordinate table is required to move in a forward direction in both co-ordinate directions by one module step, i.e. 0.200 inch. Further the hole E4 is only required in the A quarter, and therefore only the A quarter punch is required to be operated when the table carrying the board has been positioned.

Thus the programme for piercing the first hole E4 is written as shown in the first instruction row of FIG. 3. One basic module step is required in the Y-axis direction, one basic-module step is required in the X-axis direction, both steps are in the forward direction, and only the A quarter punch is to operate.

The next hole to be pierced, hole E5, is positioned at point 2.2/8, 1 from the datum point 0, 0, and is common to quarters A and B. The Y-axis position of the co-ordinate table is therefore the same as for hole E4, and the instruction for the second hole E5 concerning the Y-axis is the same, i.e. "1." The X-axis position for hole E5 is considered as being made up of two parts, firstly it is at two basic module steps from the datum, and therefore the first part of the X-axis instruction is written in FIG. 3 as "2." The co-ordinate table is also required to further move in a forward direction an additional sub-module step of 0.050 inch.

It will be seen that the three columns of FIG. 3 following both the Y-axis and the X-axis basic module column are headed .100", .050" and .025", and it will be readily apparent that by selective combination of these dimensions any one of the sub-module steps may be obtained. With regard to hole E5, a sub-module step of 0.50 inch is required, so an "X" is written in the appropriate column.

No movement is required in the Y-axis direction, so the Y-axis forward or backward column is left blank, but the X-axis movement is in the forward direction i.e. from "1" to "2." The A and B quarter punches are required to operate, so "AB" is written in the "Punches" column.

The third hole, E6, is positioned at the point 2.3/8, 1.4/8 from the datum point and is common to quarters B, C and D. The corresponding instruction row is therefore "1" again for the Y-axis basic module step, with a sub-module step of 0.100 inch, "2" again for the X-axis basic module step, with a sub-module step of 0.050 inch + 0.25 inch, i.e. 0.075 inch. There is in fact no co-ordinate table basic module movement, and punches BCD are required to operate.

While FIG. 3 shows the complete programme table, no further explanation is considered necessary in view of the foregoing details as to how the programme is compiled for the first three holes. The instructions for the remaining holes are obtained in a strictly analagous manner.

Having thus prepared a complete programme table for the production of the pierced board, the next stage is to transfer the instructions on to a machine readable medium, and in the present embodiment the instructions are put on to tape by punching holes therein, each instruction row of FIG. 3 being contained in a block of six rows on the tape, each row having five possible hole positions, excluding the usual tape driving hole provided at each row.

The normal technique of punching a hole in the tape wherever a positive instruction is required may be used. To read the tape punched according to this technique, a block of thirty sensing pins is lifted up to the tape on a tape reader, and those pins that pass through the holes each complete a positive instruction electrical circuit by coming into contact with a conducting plate above the tape.

The technique used in the present embodiment is one in which holes are punched in the tape wherever no positive instruction is required, and the tape is left unperforated for a positive instruction. In this case, the tape reader used has, as before, a block of thirty sensing pins which is lifted up to the tape, but the pins which go through the holes in the tape are non effective, while the pins which are restrained by the unpunched tape are arranged to complete individual positive instruction electrical circuits.

With this latter technique, to programme one row of the tape with for example the known 2 out of 5 code (given below) for decimal "6" (01001), holes are punched in positions one, three and four of the row on the tape.

| 0 | 1 | 2 | 3 | 4 | 5 | 6 | 7 | 8 | 9 |
|---|---|---|---|---|---|---|---|---|---|
| 1 | 1 | 1 | 1 | 0 | 0 | 0 | 0 | 0 | 0 |
| 1 | 0 | 0 | 0 | 1 | 1 | 1 | 0 | 0 | 0 |
| 0 | 1 | 0 | 0 | 1 | 0 | 0 | 1 | 1 | 0 |
| 0 | 0 | 1 | 0 | 0 | 1 | 0 | 1 | 0 | 1 |
| 0 | 0 | 0 | 1 | 0 | 0 | 1 | 0 | 1 | 1 |

Each block of instructions is put on to the tape a row at a time. The first two rows contain the Y-axis basic module and sub-module instructions, the next two rows contain the X-axis basic module and submodule instructions, the fifth row contains the instructions for either forward or backward direction of movement for both the Y-axis and the X-axis, while the sixth row contains instructions for which of the punches is to operate at that particular position. The sixth also contains a Finish instruction which is only utilized after the complete programme has been put onto the tape.

FIG. 4 shows the control panel of a tape perforator using the above mentioned latter punching technique.

There are five push buttons PB1–5, push buttons for Cancel, Space, Pierce and Index respectively, and an array of indicator lamps IL arranged in rows r1–r6 each of five lamps, each lamp position corresponding to a possible hole position in the tape.

As a positive instruction is, so to speak, put on the tape by not punching a hole, it will be clear that in any row where no positive instructions at all are required, then this row will consist of five holes.

In this case, the Space button is operated, which causes the five holes to be simultaneously punched in the corresponding row of the tape.

Where one or more positive instructions are required in a row, the corresponding one or ones of the buttons PB1–5 is or are operated, after which the Pierce button is operated with the result that holes are pierced in the tape in all holes positions except those corresponding to the operated buttons.

The Index button is operated after each row has been put on to the tape, to index the tape to the next row position.

The Cancel button is operated whenever a row to be punched is indicated by the corresponding lamps IL as being a fact incorrect. This operation will become more apparent in later description.

Row r1 of the lamps, and hence the first row on the tape, is for the number of basic module steps required in the Y-axis direction from the previous position. Considering the first row of the programme table of FIG. 3, one such step is required, and this instruction is transferred to the tape in two stages.

Decimal "1" is "10100" in 2 out of 5 code. Therefore PB1 and PB3 are operated, and lamps 1 and 3 in row r1 light up. If the wrong push buttons are operated in error, this is detected because the wrong lamps light up. The Cancel button is then operated, the lights go out, and the instruction may now be reset this time correctly. The Pierce button is now operated, which causes holes to be punched in the second, fourth and fifth hole positions on the tape, as shown in row R1 in FIG. 5.

The Index button is operated to index the tape to the next row position for punching, and to transfer operation of the buttons PB1–5 to cause lamps in row r2 to light up. Lamps 1 and 3 in the row r1 remain on, and the Cancel button, if used, is only effective to cancel the lights in the row being set up, and not in any previously completed and punched rows.

Row r2 is for instructions relating firstly to a ten or twenty shift on the number of steps put into row r1, i.e. if the number of steps had been "11," then "1" would have been put in row r1, and PB1 operated to light up the lamp marked +10 in row r2, with the result that no hole would have been punched in this hole position. However, no such ten or twenty shift is required.

Secondly, row r2 is for instructions relating to the submodule step required. If a step of for example 0.075 inch had been required, then PB3 and PB4 would have been operated to light up the lamps marked .025 and .050, respectively, with the result that no holes would have been punched in these two hole positions. But no such instruction is required.

Therefore row r2 corresponds to a row R2 (FIG. 5) of five holes, so the Space button is operated.

The two rows for the X-axis are similar to rows for the Y-axis, and are put on to the tape in the same way, the Index button being operated after each row has been punched. These two rows are rows R3 and R4 in FIG. 5.

r5 only uses four hole positions for possible instructions in the present embodiment, the last hole position being spare, and therefore a hole is always punched at this position.

In the Y-axis direction, a forward movement is required. PB1 is operated to light the lamp in r5 marked FWD. Forward movement is also required in the X-axis direction, so PB3 is operated. When the Pierce button is operated, holes are punched in the second, fourth and fifth hole positions in row R5 (FIG. 5).

In r6 the first four positions are for indicating which punches are to operate. The A quarter punch is the only one required to operate, so PB1 is operated, so that holes are punched in the remaining four hole positions in row R6 of the tape.

The complete block of instructions for the first row of FIG. 3 has now been put onto the tape, and on the perforator control panel, lamps IL corresponding to the push buttons PB1–5 operated at each row are alight. When the Index button is operated after the sixth row has been punched, all the lit lamps go out, and the perforator is set ready for receiving the next block of instructions, which starts once more at row r1.

Briefly considering the next block of instruction for the second row of the programme table of FIG. 3, this is put on to the tape as follows:

r1—PB1 and PB3 operated to give R11 in FIG. 5.
r2—No instructions, Space button operated to give R12.
r3—PB1 and PB4 operated to give R13.
r4—PB4 operated to give R14.
r5—PB3 operated to give R15.
r6—PB1 and PB2 operated to give R16.

In the like manner the whole of the programme is put onto the tape. When the final block of instructions has been put on the tape, the Space button is operated five times, with indexing between each operation, and then PB5 is operated to put the Finish instruction on to the last (sixth) row.

The programmed tape may conveniently be joined in an endless loop for controlling the board piercing equipment now to be described. Arrangements are provided for stopping the tape when the Finish instruction is reached, the tape reading not being re-started until the pierced board has been removed, and a fresh blank board inserted in the co-ordinately movable table.

Referring now to FIG. 6, the equipment comprises a board piercing machine 1, a tape reader 2, and a tape perforator 3.

The machine 1 will first be described in detail. Supported on the machine frame 4 and extending therefrom to the front of the machine are parallel guide rails 5 and 6, the rail 6 having a central slot 7. A first frame 8 is movable along the rails 5 and 6 on pairs of wheels 9 and 10 respectively, the two wheels 10 each having a central flange 11 which runs in the slot 7.

A second frame 12 is supported on the first frame 8 and is transversely movable thereon on pairs of wheels 13 and 14, the two wheels 14 each having a central flange 15 which runs in a corresponding slot 16.

The two frames 8 and 12 together constitute the coordinately movable table, already referred to, a board to be pierced being loaded into the frame 12, which is provided with suitable adjustable clamps (not shown) for holding a board of any size up to the maximum with the corner of the board corresponding to the A quarter being located hard up in corner 12A.

The frame 8 is movable in the X-axis co-ordinate direction by a first positioning unit 17, while the frame 12 is movable in the Y-axis co-ordinate direction by a second positioning unit 18.

The unit 17 includes a rack 19 one end of which is rigidly attached to the frame 8. The rack 19 is driven, in either direction, by a pinion 20 which can be rotated in either direction.

A detent pin 21 is normally withdrawn from the rack 19 during movement thereof by the pinion 20, but is engaged with the rack when movement has finished to lock the rack in position.

As has been already described, the basic module is 0.200 inch, and the rack 19 is provided with a multiplicity of holes at 0.200 inch pitch and into one of which the detent pin 21 enters to lock the rack.

The rack 19, pinion 20, and detent pin 21 together constitute the X-axis basic module positioning unit and are arranged on a base plate 22 movable along guides 23 by a sub-module positioning unit 24 having a push rod 25 extending therefrom and attached to the base plate 22. The push rod 25 may be withdrawn into the unit 24 to move the base plate 22, and therefore the rack 19 and the frame 8 in discrete forward steps of 0.025 inch, 0.050 inch, or 0.100 inch, or any combination thereof, according to the sub-module steps required.

Details of the sub-module positioning unit 24 are shown in FIGS. 7 and 8. The push rod 25 is part of a block 100 and extends therefrom through a clearance hole in a plate 101 which is rigidly coupled with a back block 102 by rods 103. The block 100 is movable along the rods 103, and so is a block 104. The blocks 100 and 104 are normally held in the position shown by springs 105.

Within the block 104 are circular rubber diaphragms 106 and 107 attached to a stepped internal portion of the block 104 by clamping rings 108 and 109 respectively. In like manner, a diaphragm 110 is attached by a clamping ring 111 to a stepped internal portion of the block 100.

A circular piston 112 is rigidly connected to the back block 102 by a dowel pin 113 so that the distance between opposing faces 114 and 115 is 0.025 inch.

Pistons 116 and 117 are rigidly coupled together by a dowel pin 118. The dimensioning of the piston 116 is such that the distance between opposing faces 119 and 120 is 0.050 inch, and the dimensioning of piston 117 is such that the distance between opposing faces 121 and 122 is 0.100 inch.

Volumes 123, 124 and 125 are individually connected to a source of compressed air (not shown).

Operation is as follows:

If compressed air is allowed to enter, for example volume 123, it naturally exerts pressure equally on one side of the diaphragm 106 and on the face 126 of the block 104.

As the piston 112 is hard up against the other side of the diaphragm 106, and is rigidly held there by the pin 113, no movement may take place in this direction. However the pressure of the air against the face 126 causes the block 104 to move bodily to the right in FIG. 8 until the two faces 114 and 115 abut each other. The block 100 is continually spring urged against the block 104 by the springs 105, and therefore the block 100 is also moved to the right and accordingly the push rod 25 moves outwards a distance of 0.025 inch.

If air is admitted into volume 124 instead of volume 123, the effect of the air pressure is to move piston 116 to the right until the faces 119 and 120 abut each other. As the piston 116 moves, the diaphragm 107 is continually pressed against it, and so must have sufficient flexibility to allow a movement of 0.050 inch. Movement of the piston 116 is transmitted to the piston 117 which accordingly moves the block 100 to the right and accordingly the push rod 25 moves outward a distance of 0.050 inch. The block 104 remains stationary and hard up against back block 102 during this operation.

If air is admitted into volume 125 only, the pressure is effective to move block 100 to the right until the faces 121 and 122 abut each other and the push rod is accordingly moved 0.100 inch to the right.

If air is admitted into more than one of the volumes 123, 124, 125, then it will be apparent that the total movement of the push rod 25 to the right is equal to the sum of individual increments selected, and that therefore appropriate selection of the volumes will produce any one of the sub-module steps.

As used in the present embodiment, each sub-module positioning unit is fully expanded, i.e. air is continually fed to the three volumes 123, 124 and 125, and the required sub-module step is obtained by selective cutting off of one or more of the air supplies so that push rod 25 is drawn to the left in FIGURES 6 and 8 during a sub-module positioning operation.

Returning to FIG. 6, the positioning unit 17 is movable as a whole along the guides 23 by an air cylinder 26 operating on a rod 27 pivotally anchored at one end to the machine frame 4 and connected at the other end to the unit 17 at a back plate 28. On the back plate 28 is a stud 29 aligned with the contact of an electrical switch 30.

The positioning unit 18 is substantially identical with the unit 17, and has a rack 31 one end of which is slotted to embrace a rod 32 attached to the frame 12.

Thus movement of the rack 31 is transmitted to the frame 12 whatever the position of the frame 8. The rack 31 is moved by pinion 33 in either direction, and is locked by detent pin 34. The supporting base plate 35 is movable along slides 36 in any of the sub-module steps by the push rod 37 of the sub-module positioning unit 38 the rear end of which is anchored to the machine frame 4.

Four punches 39, 40 and 41 and 42 (indicated only in schematic form) each have their respective punch pins correctly located over the respective A, B, C and D quarters of the board when the table is in the operating position.

The punches are operated by individual air cylinders (not shown) supported on upwardly extending portions (not shown) of the machine frame 4.

The rack 31 may conveniently be given additional steadying support by engaging it with a slide (not shown) on the adjacent frame portion for punch 40.

The position shown in FIG. 6 is the loading and unloading postion, and the table is moved to its operating position under the punches on operation of the air cylinder 26 to bring the back plate 28 hard up against a plate 43, in which position the switch 30 is operated by the stud 29 to indicate that the table is in the operating position, and to allow hole piercing to commence.

As indicated schematically, the punch pin 44, and the corresponding die (not shown) of each punch, may be located in one of a number of positions, according to the size of board to be pierced, and the punches 40, 42 may be moved closer to or further away from punches 39, 41 by a lead screw 45 operated by a hand-wheel 46, and arranged to move the portions of the frame carrying the punches 40, 42.

The positioning unit 17 moves the board carrying table in the X-axis direction of movement, and the positioning unit 18 moves the table in the Y-axis direction of movement.

The X-axis forward direction of movement of the co-ordinately movable table is towards the rear of the machine and the Y-axis forward direction of movement of the table is towards the left of the machine.

The tape reader 2 has a block of thirty sensing pins for reading the tape 45 a block at a time as already described, and is provided with suitable tape driving means for advancing the tape by one block length between each reading.

Those sensing pins which are restrained by the tape during the reading process to complete positive instruction electrical circuits, cause operation of corresponding relays in banks of relays within the cabinet of the tape reader, and the instructions thus read from the tape are transmitted via flexible cabling 49 to the machine 1 by the operation of the relay contacts.

The tape perforator 3, the operation of which has already been described, has a magazine 46 for holding a supply 47 of tape which is fed through a guide 48 at the rear of the perforator, and a vertically disposed single row of five punches, plus an additional driving hole punch, punch holes in the tape where required in each row as the tape is indexed through the guide 48.

The pinions 20 and 33 driving the racks 19 and 31 respectively are each rotated by a shaft which is rotated in either a forward or a backward direction according to the instruction received in the appropriate row in the block of the tape being read.

Also rotated by the pinion shaft is a wiper (not shown) of a conventional uniselector (not shown), as used in telephone exchange equipment, which is driven round a bank of contacts as the pinion is rotated.

The actual number of basic module steps required in the selected direction for both the X and Y-axis are read from the tape and re-converted by a suitable relay tree network into decimal notation, and a single corresponding contact of the contact bank of the uniselector is marked. When the wiper reaches this contact, the pinion shaft drive is stopped.

For any sub-module steps required the appropriate row for each axis causes energization of the required one or more of solenoids each controlling the admission of compressed air to the three volumes 123, 124, 125 (FIG. 8) of the sub-module positioning unit, and the corresponding air supply or supplies are cut off.

Thus the overall system operation involves the initial positioning of the board from the load-unload position to the reference operating position in which switch 30 is operated, this being followed by the tape-controlled coarse (basic module steps) positioning of the table via the racks 19 and 31, and the respectively associated pinions 20 and 33, while the associated sub-module units 24 and 38 remain inactive, and finally the board is finely positioned (in a sub-module step) under tape control, via signals coupled from the tape to air supply controls of the sub-module positioning units 24 and 38.

The appropriate punch or punches to be operated are selectively operated according to the tape reading, and cricuit interlocks are provided to ensure that positioning in both co-ordinate directions, and locking by the respective detent pins 21 and 34, are completed before punching takes places.

Each successive punching operation causes the automatic cancellation of the respective block instruction for that operation, and on completion of the punching a signal is passed back to the tape reader indicating that the piercing machine is ready to accept the next block of information, whereupon the tape is advanced by one block length for the next reading.

After all the required holes have been punched in the board according to the programme, reading of the Finish instruction causes the air cylinder 26 to operate to move the table out to the unloading position.

While the production and completion of the programme have been described with respect to a single board, it is also possible to utilize the same procedure with a number of boards which are considered as being laid together side by side, after which the replica of FIG. 1 is prepared treating the several boards as one.

A single board is loaded into the machine, and after unloading is cut up into the required board sizes.

It will be understood that any other suitable basic module and sub-module steps may be used, and any suitable number of punches used which will allow the board replica to be divided into a corresponding number of portions, the programme being prepared in an analogous manner to that described by graphically superimposing on a datum portion all the remaining portions.

The punches may be replaced by drills, if, for example, the board to be pierced is too thick to be punched.

It is to be understood that the foregoing description of specific examples of this invention is not to be considered as a limitation on its scope.

What we claim is:

1. Equipment for piercing sheet material including sheet material holding means movable in $x$ and $y$ co-ordinate directions, means for separately moving said holding means over maximum permissible distances $a$ and $b$ in the $x$ and $y$ co-ordinate directions respectively at least one set of two or more board piercing tools arranged on a common $x$ ordinate and each tool being spaced from at least one other tool of the set by a distance equal to the distance $b$, and means for selectively operating the piercing tools in any desired combination.

2. Equipment as claimed in claim 1 including two or more identical said sets of tools, each set being spaced from at least one other set by a distance equal to the distance $a$.

3. Equipment as claimed in claim 2 including means for adjusting the spacing between the tools of a set or between the sets.

4. Equipment as claimed in claim 2 in which the moving means for each co-ordinate direction includes a first positioning device comprising a rack attached to said holding means, a pinion for driving the rack, and detent means for engaging the rack in order to accurately locate the rack after it has been positioned by rotation of the pinion.

5. Equipment as claimed in claim 4 in which the moving means for each co-ordinate direction further includes a second positioning device arranged to bodily move the first positioning device and which comprises a plurality of serially arranged individually operable pistons having respectively different strokes, and means interconnecting the pistons with a rod attached to the first positioning device to selectively operate the pistons in any desired combination and cause the rod to be moved a distance equal to the sum of the individual strokes of the operated pistons.

6. Equipment as claimed in claim 5 including programme controlled means for automatically controlling the movements of the holding means and for causing the selective operation of the piercing tools.

7. Equipment as claimed in claim 1 including means for moving said holding means either into a first position clear of the piercing tools or into a second position in operative relationship with the piercing tools.

References Cited in the file of this patent

UNITED STATES PATENTS

| | | |
|---|---|---|
| 800,851 | Johnson | Oct. 3, 1905 |
| 2,164,046 | Zuckermann et al. | June 27, 1939 |
| 2,172,754 | Lasker et al. | Sept. 12, 1939 |
| 2,515,124 | Hilton | July 11, 1950 |
| 2,905,244 | Sonnanstine | Sept. 22, 1959 |
| 2,969,490 | Anderson et al. | Jan. 24, 1961 |